United States Patent
Teoh

(10) Patent No.: US 7,502,369 B2
(45) Date of Patent: Mar. 10, 2009

(54) HIGH SPEED INTERFACE SYSTEMS AND METHODS

(75) Inventor: Gary Chee Wooi Teoh, Batu Ferringhi (MY)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 10/859,431

(22) Filed: Jun. 2, 2004

(65) Prior Publication Data

US 2005/0271079 A1 Dec. 8, 2005

(51) Int. Cl.
*H04L 12/28* (2006.01)
(52) U.S. Cl. .................. 370/389; 370/466; 370/467
(58) Field of Classification Search .............. 370/463, 370/389, 466, 467
See application file for complete search history.

(56) References Cited

U.S. PATENT DOCUMENTS

2004/0228063 A1\* 11/2004 Hawkins et al. ............. 361/115
2005/0080887 A1\* 4/2005 Lee et al. .................... 709/223

\* cited by examiner

*Primary Examiner*—Seema S Rao
*Assistant Examiner*—Sai-Ming Chan
(74) *Attorney, Agent, or Firm*—Daly, Crowley, Mofford & Durkee, LLP

(57) ABSTRACT

Systems and methods are disclosed for providing high speed interfaces in platform management systems and in other contexts. In one embodiment, a system is provided that includes two baseboard management controllers and an interface that connects them. In one embodiment, the interface has a bandwidth that is greater than 100 kilobits per second, and comprises an IEEE 1355 interface. In one embodiment the system further includes signal conversion logic operable to convert Intelligent Platform Management Interface messages to IEEE 1355 packets and vice-versa.

23 Claims, 6 Drawing Sheets

HIGH SPEED INTERFACE SYSTEMS AND METHODS

BACKGROUND

As computing systems become increasingly complex and capable, they are relied upon to perform increasingly important tasks. The computer systems that make up networks such as the Internet and corporate intranets are often relied upon to route millions of information packets to a multitude of destinations, where the information is used in critical business processes. As a result, in the world of data communications and enterprise computing, system uptime and availability are of vital importance, and platform management and adequate redundancy are key means to achieving these ends.

In computer systems, "redundancy" typically refers to the inclusion of back-up components that can take over if the system's primary components go down, thus insuring that the system remains available for use, even if some of its parts fail. For example, a system might include multiple, otherwise identical disk drives, servers, software, and/or the like. Like redundancy, "platform management" is a technique that can be used to maximize system uptime and availability. Platform management typically refers to a set of procedures and mechanisms designed to monitor system health and performance, report errors and malfunctions, and/or facilitate recovery.

BRIEF DESCRIPTION OF THE DRAWINGS

Reference will be made to the following drawings, in which.

DESCRIPTION OF SPECIFIC EMBODIMENTS

Systems and methods are disclosed for providing a high speed interface in platform management systems and in other contexts. It should be appreciated that these systems and methods can be implemented in numerous ways, several examples of which are described below. The following description is presented to enable any person skilled in the art to make and use the inventive body of work. The general principles defined herein may be applied to other embodiments and applications. Descriptions of specific embodiments and applications are thus provided only as examples, and various modifications will be readily apparent to those skilled in the art. For example, although several examples are provided in the context of the Intelligent Platform Management Interface (IPMI) and the Institute of Electrical and Electronics Engineers 1355 standard, IEEE 1355-1996, published 1996 (IEEE 1355), it will be appreciated that the same principles can be readily applied in other contexts as well. Accordingly, the following description is to be accorded the widest scope, encompassing numerous alternatives, modifications, and equivalents. For purposes of clarity, technical material that is known in the art has not been described in detail so as not to unnecessarily obscure the inventive body of work.

Platform management and redundancy are important features in many communications and enterprise computing platforms. In order to ensure a high level of availability, computer systems can be monitored for error conditions. By quickly detecting problems, the problems can be fixed before the system goes down, or, if the system has already gone down, the amount of downtime can be minimized. Conversely, delays in detecting or responding to system failures (or conditions indicating imminent failure) increase the likelihood that the system will go down, and/or the amount of time that the system stays down.

In a system that includes redundancy, when a component fails the system can switch to a redundant, backup component and continue operation while the failed component is repaired or replaced. The process of switching from a failed primary component to its redundant backup is sometimes referred to as "failover," and the amount of time needed for this switch to occur is known as the "failover time." During failover—when neither the primary nor the backup are operational—system processing errors can occur. Thus, by reducing the failover time, the occurrence of processing errors can also be reduced.

Figure 1:
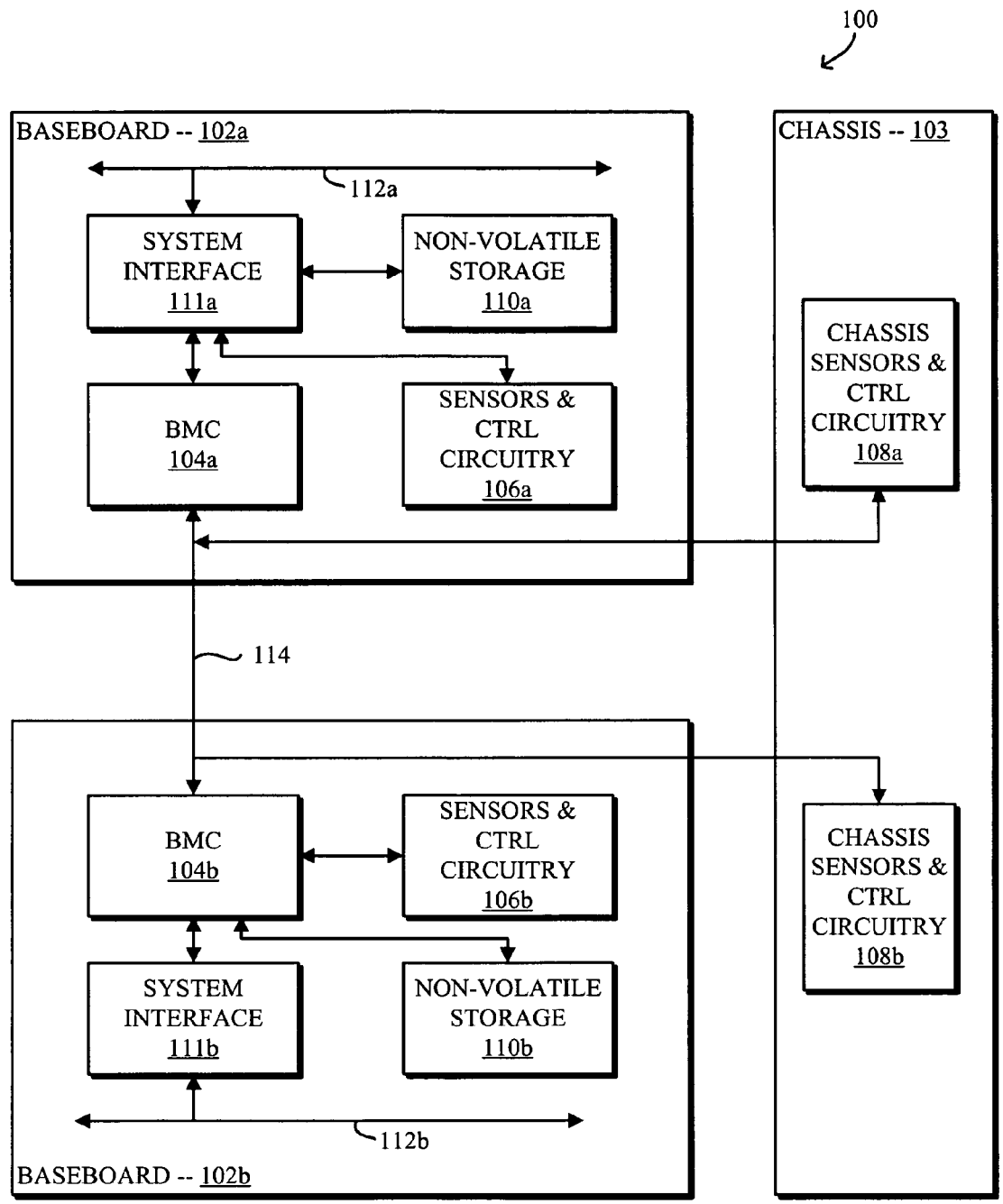
FIG. 1 is a diagram of a platform management system.

FIG. 1 shows an illustrative platform management system 100. The platform management system 100 may monitor system temperatures, voltages, fans, power supplies, buses, and the like. Upon detecting anomalous conditions, the system can initiate automatic recovery and diagnostic capabilities, such as local or remote system resets, user-defined operations, failover, and/or system alerts. In one embodiment, the system 100 shown in FIG. 1 comprises a CompactPCI 2.16-based redundant host system that makes use of the Intelligent Platform Management Interface (IPMI), which defines a set of standardized software interfaces to a platform management subsystem. In other embodiments, other redundant host system hardware and/or platform management techniques can be used.

The system shown in FIG. 1 includes two system baseboards 102a, 102b to ensure redundancy for control plane applications. If one of the baseboards fails, the other can effectively take over as the domain owner so that applications will not be affected by the failed board. The faulty board can then be removed and replaced with minimal (or no) interruption or system downtime.

As shown in FIG. 1, each baseboard 102 is equipped with a baseboard management controller (BMC) 104 to manage this redundant feature and to perform other platform management tasks. Each BMC 104 serves as the central management controller for its board 102, and manages the interface between the platform management hardware and the system management software, providing monitoring and recovery control, and a gateway to other platform management controllers.

For example, in the embodiment shown in FIG. 1, each BMC 104 has access to sensors and control circuitry 106, 108 on the baseboard 102 and the system chassis 103, which monitors voltages, temperatures, fans, and the like, and is operable to take action (such as performing a system reset) at the BMC's command. Information obtained from sensors 106, 108, as well as system event logs, software, and information generated by BMCs 104 can be stored in non-volatile storage 110 for later use. The BMC hardware communicates with the system software via system interface 111 and system bus 112.

In the embodiment shown in FIG. 1, the BMCs 104 on each board 102 communicate with each other over bus 114 to exchange status information about hardware resources, device drivers, and the like so that both hosts remain updated and synchronized, and ready to assume control in the event of a failover. One way for the BMCs to communicate is via an Intelligent Platform Management Bus (IPMB), such as an Inter-Integrated Circuit ($I^2C$) bus. $I^2C$ buses typically have a bandwidth of about 100 kilobits per second (kbps), or 400 kbps in fast mode. Exchanging relatively large amounts of data between redundant hosts using a 100 kbps connection can take a significant amount of time.

Figure 2:
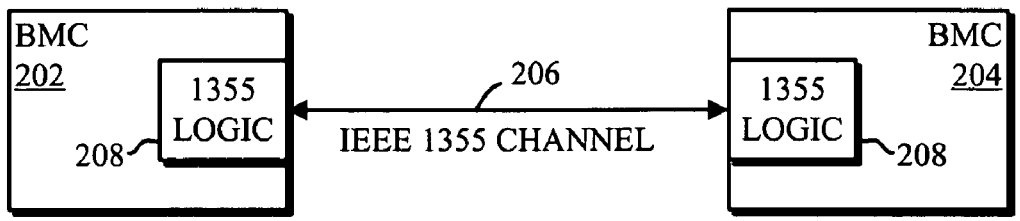
FIG. 2 shows an exemplary implementation of a relatively fast interface for inter-host or inter-baseboard management controller communication in a platform management system.

FIG. 2 shows an exemplary implementation of a faster interface for inter-host or inter-BMC communications. In one embodiment, the system shown in FIG. 2 uses a serial interface specified in the Institute of Electrical and Electronics Engineers standard 1355-1996 (IEEE 1355) as a high speed communication channel 206 between two BMCs 202, 204. In one embodiment the IEEE 1355 serial interface has a bandwidth of about 200 megabits per second (Mbps) (i.e., approximately 2000 times faster than an $I^2C$ bus). In the embodiment shown in FIG. 2, the logic 208 for generating and interpreting IEEE 1355 signals is incorporated directly into BMCs 202, 204.

Figure 3:
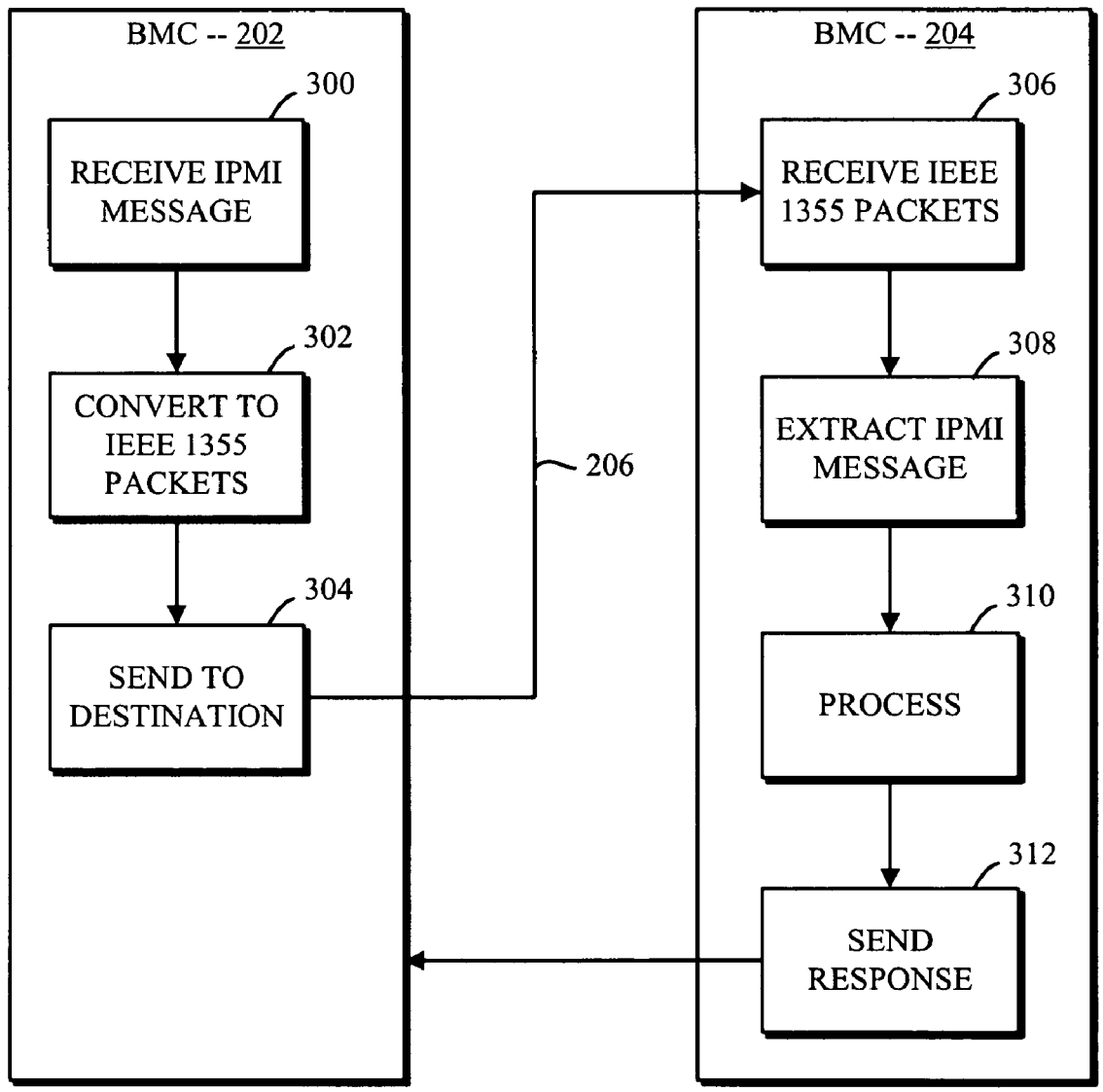
FIG. 3 is a flowchart of a method for communicating between hosts or baseboard management controllers in a system such as that shown in FIG. 2.

As shown in FIG. 3, when a BMC 202 transmits a message to another BMC 204, the source BMC 202 may, in one embodiment, package IPMI messages into IEEE 1355 packets (blocks 300-302) which are then sent directly to the destination BMC 204 via channel 206 (block 304). The destination BMC 204 receives the IEEE 1355 packets (block 306), extracts the IPMI messages (block 308), processes them (block 310), and may send responsive packets back to BMC 202 using a process similar to that shown in blocks 300 through 304 (block 312).

Using the systems and methods shown in FIGS. 2 and 3, IPMI messages can thus be readily transmitted between two BMCs at a throughput of approximately 200 Mbps (or more), thus enabling faster data synchronization between two hosts, and thereby increasing the reliability and effectiveness of the system's redundant features.

It should be appreciated that FIG. 2 is provided for purposes of illustration, and not limitation, and that the systems and methods described herein can be practiced with devices and architectures that lack some of the components and features shown or described in connection with FIG. 2, and/or that have other components or features. For example, in some embodiments communications protocols other than IEEE 1355 could be used. In addition, in some embodiments the source BMC 202 may package outgoing messages directly into IEEE 1355 packets, rather than first composing an IPMI message and then packaging it into one or more IEEE 1355 packets prior to transmission. Similarly, in such embodiments the destination BMC 204 could receive IEEE 1355 packets and interpret them directly, rather than first extracting one or more IPMI messages from the IEEE 1355 packets.

It will be appreciated that the basic architecture shown in FIG. 2 is also readily adaptable for broader application. For example, although FIG. 2 illustrates communication between two BMCs, it will be appreciated that the techniques described in connection with FIG. 2 could also be used to facilitate communication between additional BMCs and/or remote management cards, and/or between other types of controllers, hosts, and/or devices. Thus, for example, the architecture shown in FIG. 2 can be used as a cost effective alternative to Ethernet for connecting two redundant chassis management controllers for the purpose of platform data exchange in, e.g., a CompactPCI 2.16 redundant host system. An advantage over conventional Ethernet is that data can be exchanged even without the operating system running or the board actually powering on.

Figure 4:
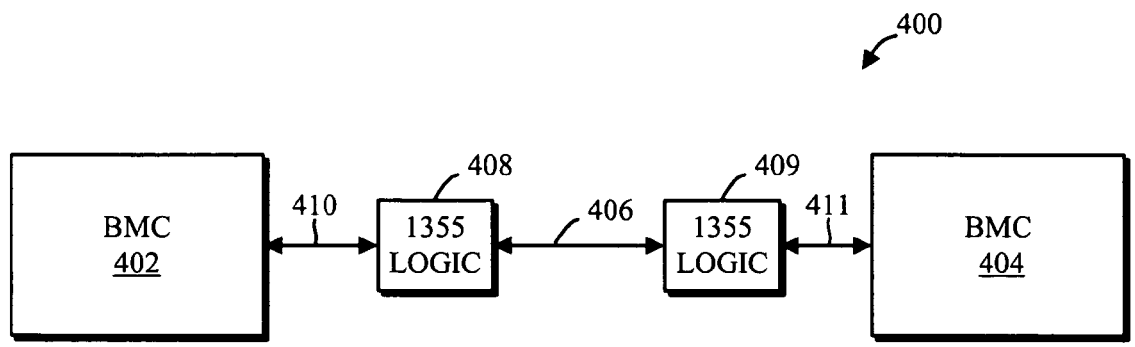
FIG. 4 is a diagram of another inter-host or inter-baseboard management controller communication arrangement.
Figure 5:
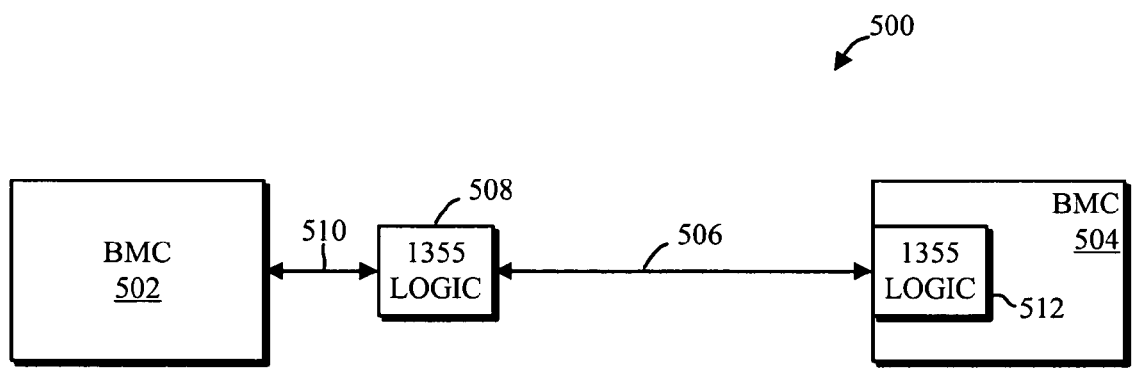
FIG. 5 is a diagram of another arrangement for facilitating communication between hosts or baseboard management controllers.

As previously indicated, in one embodiment the system shown in FIG. 2 translates IPMI messages to IEEE 1355 packets and vice-versa, with the logic for converting between IPMI and IEEE 1355 embedded directly in the BMC chip (e.g., as software, firmware, custom or programmable circuitry, and/or the like). As shown in FIGS. 4 and 5, in other embodiments some or all of this translation logic can be implemented externally, using, e.g., a programmable logic device (PLD), a field-programmable gate array (FPGA), software, firmware, and/or the like. This approach facilitates backwards compatibility with existing BMCs that do not have a native IEEE 1355 interface and/or built-in logic for translating IPMI messages to IEEE 1355 packets.

Referring to FIG. 4, a system 400 is shown in which neither the source BMC 402 nor the destination BMC 404 contains a native IEEE 1355 interface or logic for converting IPMI messages into IEEE 1355 packets. Thus, in this embodiment source BMC 402 transmits IPMI messages over an IPMI bus 410 to a separate IEEE 1355 converter 408, which translates the messages into IEEE 1355 packets, and re-transmits them on to destination BMC 404 over IEEE 1355 bus 406. In the embodiment shown in FIG. 4, the destination BMC 404 also lacks built-in logic for converting IPMI messages to IEEE 1355 packets. Thus, incoming IEEE 1355 packets are intercepted by converter 409, which translates the IEEE 1355 packets into IPMI messages and sends them to destination BMC 404 over IPMI bus 411.

FIG. 5 illustrates a system 500 similar to those shown in FIGS. 2 and 4, in which one BMC 502 does not have built-in logic for converting IPMI messages to IEEE 1355 packets, while another BMC 504 does. In this system, when BMC 502 transmits data to BMC 504, the data is first transmitted over an IPMI bus 510 to an IEEE 1355 converter 508 where it is converted from IPMI messages to IEEE 1355 packets. Converter 508 then forwards the IEEE 1355 packets to BMC 504 over channel 506, where built-in IEEE 1355 conversion logic 512 converts the packets into IPMI messages or any other native format that BMC 512 is designed to handle.

Figure 6:
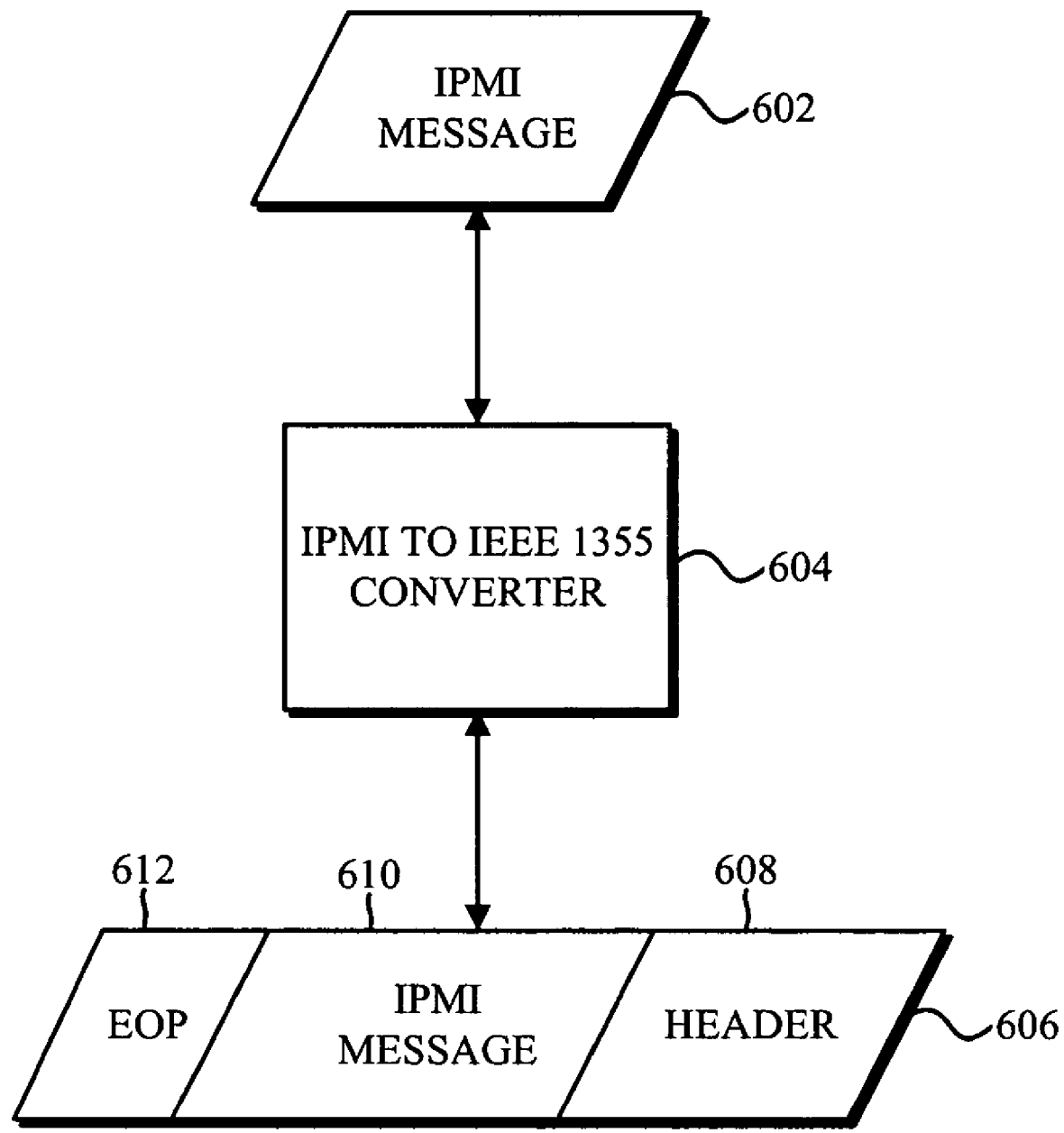
FIG. 6 illustrates the conversion of Intelligent Platform Management Interface messages to IEEE 1355 packets, and vice-versa.
Figure 7:
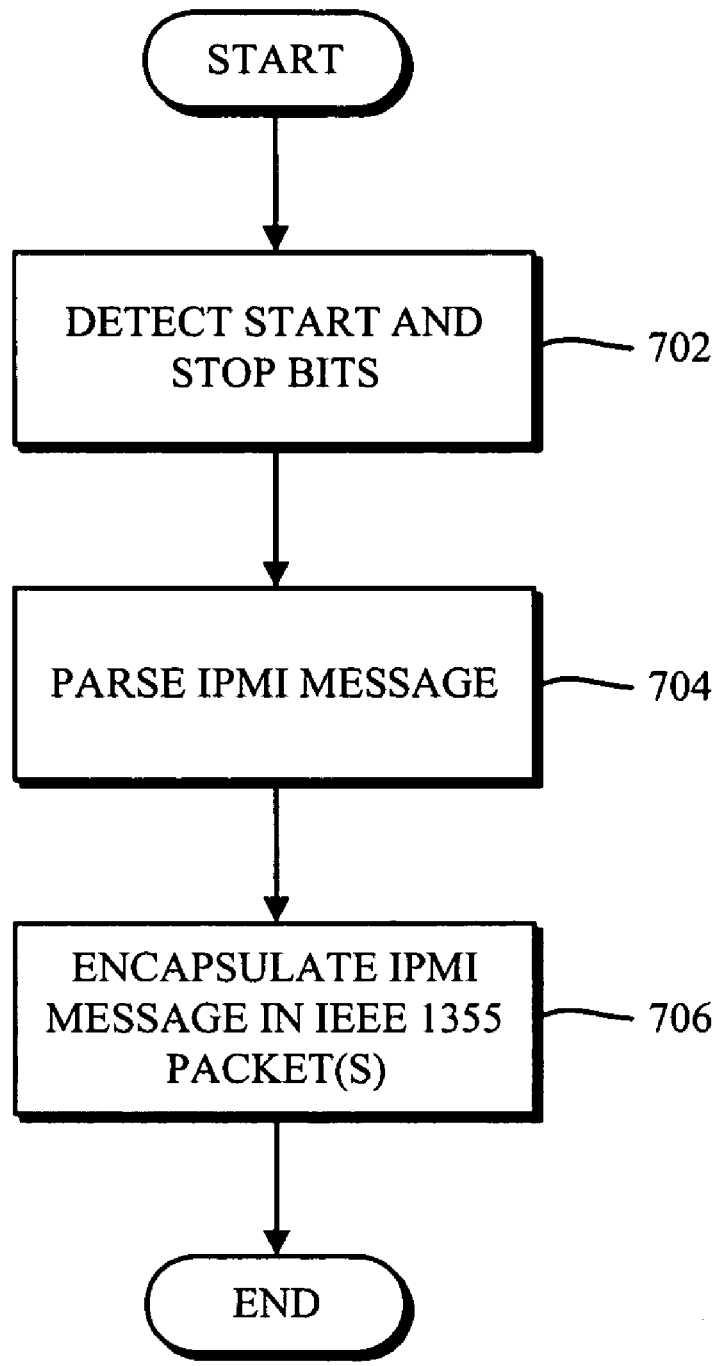
FIG. 7 shows a method for converting Intelligent Platform Management Interface messages to IEEE 1355 packets, and vice-versa.

The operation of illustrative logic for converting IPMI messages to IEEE 1355 packets, and vice-versa, is shown in FIGS. 6 and 7. As shown in FIG. 6, IPMI to IEEE 1355 converter 604 is operable to receive an IPMI message 602 and convert it into one or more IEEE 1355 packets 606. Converter 604 detects the start and stop bits that delimit an IPMI message 602, then packages the IPMI message into one or more IEEE 1355 packets 606 by adding a header 608 and an end of packet (EOP) field 612 to the IPMI message 610. In one embodiment, header 608 comprises a one byte field that specifies the destination of the packet 606. EOP field 612 is typically less than a byte, and signifies the end of the packet.

FIG. 7 provides a more detailed illustration of the operation of signal conversion logic 604 in one embodiment. Referring to FIG. 7, to convert an IPMI message into a set of one or more IEEE 1355 packets, the signal conversion logic first detects a pair of start and stop bits on an $I^2C$ bus (block 702), and parses the IPMI message contained therebetween (block 704). The signal conversion logic then encapsulates the IPMI message into one or more IEEE 1355 packets (block 706), adds appropriate header information, and sends the packets on to their destination.

The process shown in FIG. 7 is reversed when converting an IEEE 1355 packet into an IPMI message. In one embodiment the signal conversion logic 604 is capable of detecting the direction of the IPMI message so that the appropriate conversion process can be performed automatically and transparently to the user.

While FIGS. 1 through 7 illustrate the design and operation of a platform management system, it will be appreciated that the systems and methods described herein can be applied in other contexts as well. For example, embodiments of the interfaces described herein can be used as a more cost effective alternative to Ethernet when used as a point to point connection, e.g., in a system chassis environment. As yet another example, embodiments of the interfaces described herein can also be used to provide a high speed link between redundant chassis management controllers in a CompactPCI 2.16 system.

The systems and methods described above can be used in a variety of computer systems. For example, without limitation, embodiments of the platform management system described above can be used to monitor and manage a server in a network processing environment.

Figure 8:
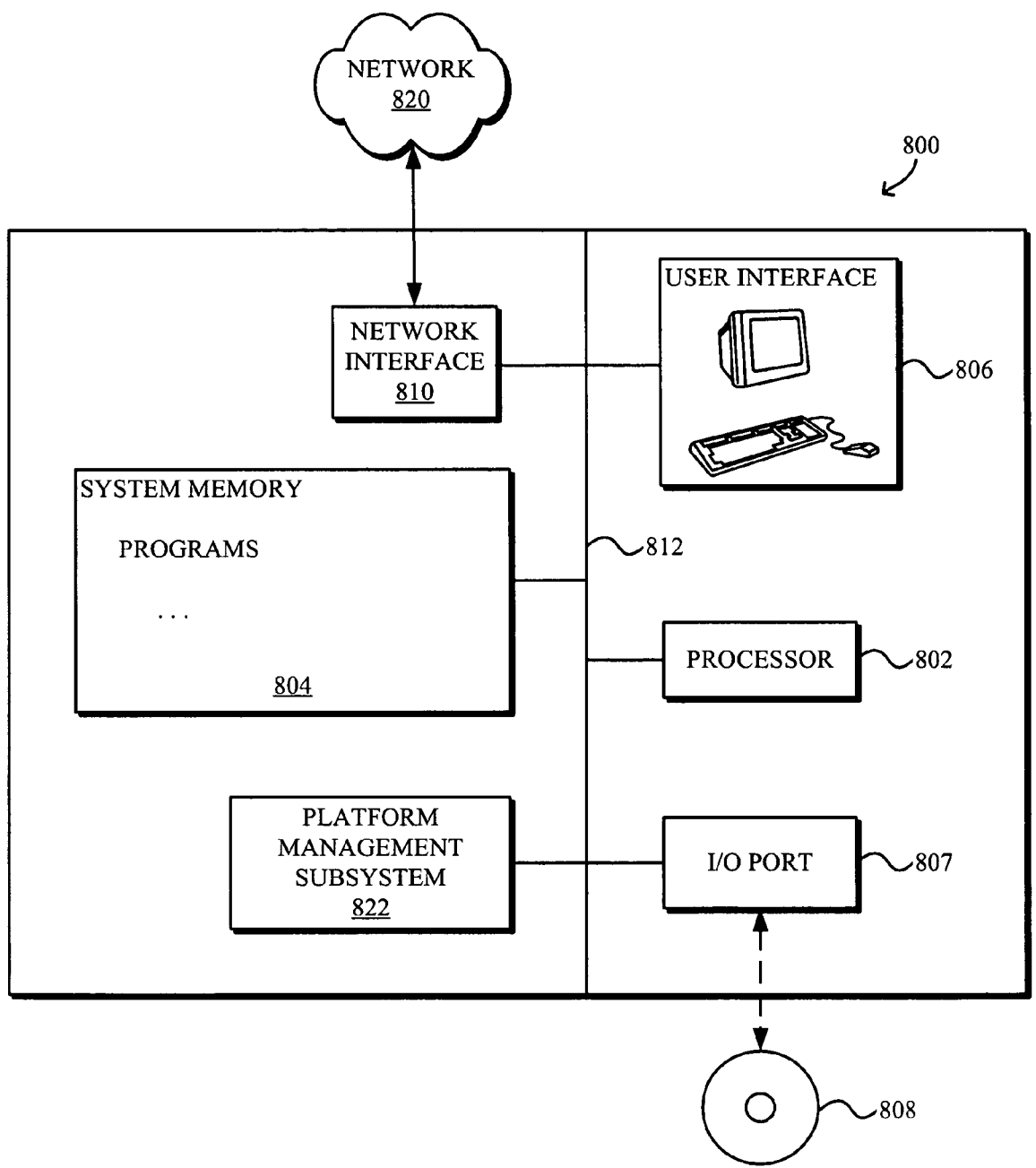
FIG. 8 shows an illustrative system that utilizes platform management systems and techniques.

FIG. 8 shows an example of such a computer system 800. As shown in FIG. 8, in one embodiment system 800 comprises a computing device such as a network server, and includes one or more processors 802, memory 804, a user interface 806, one or more input/output ports 807 for accepting removable storage media 808, a network interface 810, and a bus 812 for connecting the aforementioned elements.

The operation of system 800 will typically be controlled by processor 802 operating under the guidance of programs stored in memory 804. Memory 804 will generally include some combination of computer readable media, such as high-speed random-access memory (RAM) and non-volatile memory such as read-only memory (ROM), a magnetic disk, disk array, and/or tape array. Port 807 may comprise a disk drive, Universal Serial Bus (USB) port, or memory slot for accepting computer-readable media such as diskettes, compact disk-read-only memory (CD-ROM), digital versatile disks (DVDs), USB cards, memory cards, magnetic tapes, and/or the like. User interface 806 may, for example, comprise a keyboard, mouse, and/or the like for entering information, and one or more mechanisms such as a display, printer, speaker, and/or the like for presenting information to a user. Network interface 810 is typically operable to provide a connection between system 800 and other systems (and/or networks 820) via a wired, wireless, optical, and/or other connection.

As described above, system 800 may also include a platform management subsystem 822, such as that described in connection with FIGS. 1 through 7, for monitoring and controlling the performance of system 800. The platform management system may include redundant baseboards, as shown in FIG. 1, and may also have its own power supply, thereby enabling it to monitor system characteristics, even when the rest of system 800 is powered down.

It should be appreciated that the systems and methods described herein can be practiced with devices and/or architectures that lack some of the components shown in FIG. 8 and/or that have other components that are not shown. Thus, it should be appreciated that FIG. 8 is provided for purposes of illustration and not limitation. For example, it should be appreciated that while, for purposes of illustration, system 800 is depicted as a single, general-purpose computing device such as a personal computer or a network server, in other embodiments system 800 could comprise one or more such systems operating together using distributed computing techniques. In such embodiments, some or all of the components and functionality depicted in FIG. 8 could be spread amongst multiple systems at multiple locations. It will be readily apparent that many similar variations could be made to the illustration shown in FIG. 8.

Thus, while several embodiments are described and illustrated herein, it will be appreciated that they are merely illustrative. Other embodiments are within the scope of the following claims.

What is claimed is:

1. A platform management system comprising:
a first platform management controller;
a second platform management controller;
an IEEE 1355 interface to communicatively couple the first platform management controller with the second platform management controller, the interface having a bandwidth of greater than 100 kilobits per second;
first signal conversion logic operable to convert Intelligent Platform Management Interface messages to IEEE 1355 packets; and
second signal conversion logic operable to convert IEEE 1355 packets to Intelligent Platform Management Interface messages.

2. The system of claim 1, in which the first and second platform management controllers comprise baseboard management controllers.

3. The system of claim 1, in which the first and second platform management controllers comprise chassis management controllers.

4. The system of claim 1, in which the interface has a bandwidth of at least approximately 200 megabits per second.

5. The system of claim 1, in which the interface has a bandwidth greater than at least approximately 400 kilobits per second.

6. The system of claim 1, in which the first signal conversion logic is integrated with the first platform management controller.

7. The system of claim 6, in which the second signal conversion logic is integrated with the second platform management controller.

8. The system of claim 1, in which the first signal conversion logic is implemented externally to the first platform management controller.

9. The system of claim 8, in which the second signal conversion logic is integrated with the second platform management controller.

10. The system of claim 1, further comprising a third platform management controller operable to communicate with the first and second platform management controllers using the interface, wherein the third platform management controller comprises third signal conversion logic operable to translate between IEEE 1355 packets and Intelligent Platform Management Interface messages.

11. The system of claim 1, further comprising a CompactPCI 2.16-based redundant host system.

12. A method comprising:
receiving an Intelligent Platform Management Interface message at a first baseboard management controller;
converting the Intelligent Platform Management Interface message into one or more IEEE 1355 packets; and
transmitting the one or more IEEE 1355 packets to a second baseboard management controller.

13. The method of claim 12, in which converting the Intelligent Platform Management Interface message into one or more IEEE 1355 packets is performed by conversion logic external to the baseboard management controller.

14. The method of claim 12, further comprising detecting a stop bit in the Intelligent Platform Management Interface message.

15. The method of claim 12, further comprising detecting a direction of the Intelligent Platform Management Interface message, wherein the one or more IEEE 1355 packets are transmitted in the direction of the Intelligent Platform Management Interface message.

16. The method of claim 12, further comprising: receiving the one or more IEEE 1355 packets at the second baseboard management controller; and recovering the Intelligent Platform Management Interface message from the one or more IEEE 1355 packets.

17. A computer program product embodied on a computer readable medium, the computer program product including instructions that, when executed by a processor, cause the processor to perform actions comprising: receiving an Intelligent Platform Management Interface message; detecting a start bit and a stop bit associated with the Intelligent Platform Management Interface message; and packaging the Intelligent Platform Management Interface message into one or more IEEE 1355 packets.

18. The computer program product of claim 17, in which the processor comprises a baseboard management controller.

19. The computer program product of claim 17, further including instructions that, when executed by a processor, cause the processor to perform actions comprising detecting a direction of the TPMI message, wherein the IEEE 1355 packets are transmitted in the detected direction of the Intelligent Platform Management Interface message.

20. A platform management system, comprising:
a baseboard management controller;
one or more sensors;
an interface to communicatively couple the baseboard management controller with one or more remote platform management controllers, the interface having a bandwidth of greater than 100 kilobits per second,
wherein the interface comprises:
an IEEE 1355 interface;
first signal conversion logic operable to convert Intelligent Platform Management Interface messages to IEEE 1355 packets; and
second signal conversion logic operable to convert IEEE 1355 packets to Intelligent Platform Management Interface messages.

21. The system of claim 20, in which the interface has a bandwidth of at least approximately 200 megabits per second.

22. A system comprising:
a processor;
memory;
a network interface;
a user interface;
a platform management sub-system, the platform management sub-system comprising:
a baseboard management controller;
a plurality of sensors operable to measure system parameters;
an IEEE 1355 interface to communicatively couple the baseboard management controller with one or more remote platform management controllers, the interface having a bandwidth of greater than 100 kilobits per second,
wherein the IEEE 1355 interface comprises:
first signal conversion logic operable to convert Intelligent Platform Management Interface messages to IEEE 1355 packets; and
second signal conversion logic operable to convert IEEE 1355 packets to Intelligent Platform Management Interface messages.

23. The system of claim 22, in which the interface has a bandwidth of at least approximately 200 megabits per second.

* * * * *

UNITED STATES PATENT AND TRADEMARK OFFICE
CERTIFICATE OF CORRECTION

| | | |
|---|---|---|
| PATENT NO. | : 7,502,369 B2 | Page 1 of 1 |
| APPLICATION NO. | : 10/859431 | |
| DATED | : March 10, 2009 | |
| INVENTOR(S) | : Teoh | |

It is certified that error appears in the above-identified patent and that said Letters Patent is hereby corrected as shown below:

In column 7, line 30, in Claim 19, delete "TPMI" and insert -- IPMI --, therefor.

Signed and Sealed this

Second Day of June, 2009

JOHN DOLL
*Acting Director of the United States Patent and Trademark Office*